United States Patent
Bishop et al.

(10) Patent No.: US 9,374,389 B2
(45) Date of Patent: Jun. 21, 2016

(54) METHOD AND SYSTEM FOR ENSURING AN APPLICATION CONFORMS WITH SECURITY AND REGULATORY CONTROLS PRIOR TO DEPLOYMENT

(71) Applicant: Intuit Inc., Mountain View, CA (US)

(72) Inventors: Thomas Bishop, San Diego, CA (US); Brett Weaver, San Diego, CA (US); Christian Price, San Diego, CA (US); Javier Godinez, Bonita, CA (US); Capen Brinkley, San Diego, CA (US); M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 90 days.

(21) Appl. No.: 14/261,621

(22) Filed: Apr. 25, 2014

(65) Prior Publication Data

US 2015/0312274 A1    Oct. 29, 2015

(51) Int. Cl.
*H04L 29/06* (2006.01)

(52) U.S. Cl.
CPC ..................................... *H04L 63/20* (2013.01)

(58) Field of Classification Search
None
See application file for complete search history.

(56) References Cited

U.S. PATENT DOCUMENTS

| 5,731,991 | A  | 3/1998  | Kinra et al.  |
|-----------|----|---------|---------------|
| 6,085,224 | A  | 7/2000  | Wagner        |
| 6,205,552 | B1 | 3/2001  | Fudge         |
| 6,343,236 | B1 | 1/2002  | Gibson et al. |
| 6,549,932 | B1 | 4/2003  | McNally et al.|
| 6,651,183 | B1 | 11/2003 | Gensler et al.|
| 7,114,183 | B1 | 9/2006  | Joiner        |
| 7,296,261 | B2 | 11/2007 | Witchel et al.|
| 7,426,745 | B2 | 9/2008  | McCarty       |
| 7,506,371 | B1 | 3/2009  | Ben-Natan     |
| 7,552,424 | B1 | 6/2009  | Bischof et al.|

(Continued)

FOREIGN PATENT DOCUMENTS

| EP | 2 541 420   | 1/2013  |
|----|-------------|---------|
| WO | WO 02/91182 | 11/2002 |

(Continued)

OTHER PUBLICATIONS

Lietz et al., "Method and System for Dynamic and Comprehensive Vulnerability Management," U.S. Appl. No. 14/052,971, filed Oct. 14, 2013.

(Continued)

*Primary Examiner* — Kaveh Abrishamkar
(74) *Attorney, Agent, or Firm* — Hawley Troxell Ennis & Hawley LLP; Philip McKay

(57) ABSTRACT

Asset security compliance data ensuring defined asset security policies are applied to the creation and/or operation of assets to be used to implement an application and application deployment security compliance data for ensuring compliance with one or more application deployment security policies associated with the deployment of assets used to implement the application is generated. The asset security compliance data is then used to ensure each asset used to implement the application is created and used in compliance with asset security policies and the application deployment security compliance data is used to ensure that each asset used to implement the application is deployed in compliance with the application deployment security policies.

18 Claims, 3 Drawing Sheets

(56) References Cited

U.S. PATENT DOCUMENTS

| | | | |
|---|---|---|---|
| 7,640,458 B2 | 12/2009 | Rao et al. | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,925,527 B1 | 4/2011 | Flam | |
| 7,944,355 B2 | 5/2011 | Kumar et al. | |
| 7,996,836 B1 | 8/2011 | McCorkendale et al. | |
| 8,001,422 B1 | 8/2011 | Sun et al. | |
| 8,095,962 B2 | 1/2012 | Condon | |
| 8,171,485 B2 | 5/2012 | Muller | |
| 8,171,554 B2 | 5/2012 | Elovici et al. | |
| 8,181,036 B1 | 5/2012 | Nachenberg | |
| 8,281,399 B1 | 10/2012 | Chen et al. | |
| 8,312,516 B1 | 11/2012 | Malatesta | |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,615,785 B2 | 12/2013 | Elrod et al. | |
| 8,688,820 B1 | 4/2014 | Bhogi et al. | |
| 8,776,050 B2 | 7/2014 | Plouffe et al. | |
| 8,813,225 B1 | 8/2014 | Fuller et al. | |
| 9,049,105 B1 | 6/2015 | Feinstein et al. | |
| 9,112,841 B1 | 8/2015 | Brandwine et al. | |
| 2002/0099992 A1 | 7/2002 | Distler et al. | |
| 2002/0116404 A1 | 8/2002 | Cha et al. | |
| 2003/0051154 A1 | 3/2003 | Barton et al. | |
| 2003/0084327 A1 | 5/2003 | Lingafelt et al. | |
| 2003/0195959 A1 | 10/2003 | Labadie et al. | |
| 2004/0006704 A1 | 1/2004 | Dahlstrom et al. | |
| 2004/0181775 A1 | 9/2004 | Anonsen et al. | |
| 2004/0237093 A1 | 11/2004 | Sluiman et al. | |
| 2005/0066309 A1 | 3/2005 | Creamer et al. | |
| 2005/0091304 A1 | 4/2005 | Trayler | |
| 2005/0155013 A1 | 7/2005 | Carrigan | |
| 2005/0172162 A1 | 8/2005 | Takahashi et al. | |
| 2005/0182969 A1 | 8/2005 | Ginter et al. | |
| 2005/0193231 A1 | 9/2005 | Scheuren | |
| 2005/0193269 A1 | 9/2005 | Haswell et al. | |
| 2005/0204151 A1 | 9/2005 | Fang et al. | |
| 2005/0278790 A1 | 12/2005 | Birk et al. | |
| 2006/0090206 A1 | 4/2006 | Ladner et al. | |
| 2006/0101520 A1 | 5/2006 | Schumaker et al. | |
| 2006/0184838 A1 | 8/2006 | Singonahalli et al. | |
| 2006/0293940 A1 | 12/2006 | Tsyganskiy et al. | |
| 2007/0027999 A1 | 2/2007 | Allen et al. | |
| 2007/0079168 A1 | 4/2007 | Sivakumar et al. | |
| 2007/0094711 A1 | 4/2007 | Corley et al. | |
| 2007/0180509 A1 | 8/2007 | Swartz et al. | |
| 2007/0185875 A1 | 8/2007 | Chang et al. | |
| 2007/0250424 A1* | 10/2007 | Kothari | G06Q 10/00 705/36 R |
| 2008/0016570 A1 | 1/2008 | Capalik | |
| 2008/0025288 A1 | 1/2008 | Benner et al. | |
| 2008/0044018 A1 | 2/2008 | Scrimsher et al. | |
| 2008/0148398 A1 | 6/2008 | Mezack et al. | |
| 2008/0262990 A1 | 10/2008 | Kapoor et al. | |
| 2008/0263670 A1 | 10/2008 | Stavrica | |
| 2008/0295076 A1 | 11/2008 | McKain et al. | |
| 2009/0007264 A1* | 1/2009 | Chatterjee | G06F 21/577 726/22 |
| 2009/0089682 A1 | 4/2009 | Baier et al. | |
| 2009/0106838 A1 | 4/2009 | Clark et al. | |
| 2009/0199273 A1 | 8/2009 | Yalamanchi | |
| 2009/0254990 A1 | 10/2009 | McGee | |
| 2009/0288078 A1 | 11/2009 | Makonahalli et al. | |
| 2009/0300045 A1 | 12/2009 | Chaudhry et al. | |
| 2009/0300423 A1 | 12/2009 | Ferris | |
| 2009/0319527 A1 | 12/2009 | King et al. | |
| 2010/0070964 A1 | 3/2010 | Blumfield et al. | |
| 2010/0077203 A1 | 3/2010 | Ogawa et al. | |
| 2010/0122317 A1 | 5/2010 | Yadav | |
| 2010/0192220 A1 | 7/2010 | Heizmann et al. | |
| 2010/0212010 A1 | 8/2010 | Stringer et al. | |
| 2010/0217850 A1 | 8/2010 | Ferris | |
| 2010/0251363 A1 | 9/2010 | Todorovic | |
| 2010/0257599 A1 | 10/2010 | Gleichauf | |
| 2010/0269121 A1 | 10/2010 | Montesissa et al. | |
| 2010/0306354 A1 | 12/2010 | DeHaan et al. | |
| 2010/0318481 A1 | 12/2010 | Feynman | |
| 2011/0029957 A1 | 2/2011 | Shufer et al. | |
| 2011/0034182 A1 | 2/2011 | Issa et al. | |
| 2011/0047621 A1 | 2/2011 | Brando et al. | |
| 2011/0055921 A1 | 3/2011 | Narayanaswamy et al. | |
| 2011/0138382 A1 | 6/2011 | Hauser et al. | |
| 2011/0138469 A1 | 6/2011 | Ye et al. | |
| 2011/0145657 A1 | 6/2011 | Bishop et al. | |
| 2011/0154324 A1 | 6/2011 | Pagan et al. | |
| 2011/0208677 A1 | 8/2011 | Zhou et al. | |
| 2011/0238855 A1 | 9/2011 | Korsunsky et al. | |
| 2012/0005750 A1 | 1/2012 | Satish | |
| 2012/0039336 A1 | 2/2012 | Richmond et al. | |
| 2012/0072985 A1 | 3/2012 | Davne et al. | |
| 2012/0117654 A1 | 5/2012 | Yalakanti | |
| 2012/0151488 A1 | 6/2012 | Arcese et al. | |
| 2012/0185390 A1 | 7/2012 | Palnitkar et al. | |
| 2012/0185913 A1 | 7/2012 | Martinez et al. | |
| 2012/0209947 A1 | 8/2012 | Glaser et al. | |
| 2012/0210437 A1 | 8/2012 | Karande et al. | |
| 2012/0233668 A1 | 9/2012 | Leafe et al. | |
| 2012/0303776 A1 | 11/2012 | Ferris | |
| 2012/0304300 A1 | 11/2012 | LaBumbard | |
| 2012/0311157 A1 | 12/2012 | Erickson et al. | |
| 2012/0324572 A1 | 12/2012 | Gordon et al. | |
| 2012/0324576 A1 | 12/2012 | Clark et al. | |
| 2013/0019242 A1 | 1/2013 | Chen et al. | |
| 2013/0046667 A1 | 2/2013 | Hill et al. | |
| 2013/0054792 A1 | 2/2013 | Sharaf | |
| 2013/0055398 A1 | 2/2013 | Li et al. | |
| 2013/0067067 A1 | 3/2013 | Miri et al. | |
| 2013/0091376 A1 | 4/2013 | Raspudic et al. | |
| 2013/0097316 A1 | 4/2013 | Bender et al. | |
| 2013/0104237 A1 | 4/2013 | Riley et al. | |
| 2013/0117809 A1 | 5/2013 | McDougal et al. | |
| 2013/0117852 A1 | 5/2013 | Stute | |
| 2013/0160072 A1 | 6/2013 | Reus et al. | |
| 2013/0174259 A1 | 7/2013 | Pearcy et al. | |
| 2013/0185795 A1 | 7/2013 | Winn et al. | |
| 2013/0238786 A1 | 9/2013 | Khesin | |
| 2013/0247135 A1 | 9/2013 | Kundu et al. | |
| 2013/0276152 A1 | 10/2013 | Hirsch et al. | |
| 2013/0291068 A1 | 10/2013 | Huang et al. | |
| 2013/0291087 A1 | 10/2013 | Kailash et al. | |
| 2013/0305357 A1 | 11/2013 | Ayyagari et al. | |
| 2013/0305369 A1 | 11/2013 | Karta et al. | |
| 2013/0305371 A1 | 11/2013 | Figlin et al. | |
| 2013/0339514 A1 | 12/2013 | Crank et al. | |
| 2013/0347131 A1 | 12/2013 | Mooring et al. | |
| 2014/0013452 A1 | 1/2014 | Aissi et al. | |
| 2014/0026122 A1 | 1/2014 | Markande et al. | |
| 2014/0026179 A1 | 1/2014 | Devarajan et al. | |
| 2014/0068784 A1* | 3/2014 | Merkow | H04L 63/102 726/26 |
| 2014/0082621 A1 | 3/2014 | Fitzgerald et al. | |
| 2014/0089204 A1 | 3/2014 | Spies et al. | |
| 2014/0165130 A1 | 6/2014 | Zaitsev | |
| 2014/0173738 A1 | 6/2014 | Condry et al. | |
| 2014/0189680 A1 | 7/2014 | Kripalani | |
| 2014/0214460 A1 | 7/2014 | Rahnama | |
| 2014/0258446 A1 | 9/2014 | Bursell | |
| 2014/0258715 A1 | 9/2014 | Rodniansky | |
| 2014/0282840 A1 | 9/2014 | Guinan | |
| 2014/0289854 A1 | 9/2014 | Mahvi | |
| 2014/0317737 A1 | 10/2014 | Shin et al. | |
| 2014/0344933 A1 | 11/2014 | Huh et al. | |
| 2015/0032587 A1 | 1/2015 | Broom et al. | |
| 2015/0052108 A1 | 2/2015 | Volk et al. | |
| 2015/0052402 A1 | 2/2015 | Gurumurthy et al. | |
| 2015/0095691 A1 | 4/2015 | Edwards | |

(56) References Cited

U.S. PATENT DOCUMENTS

FOREIGN PATENT DOCUMENTS

| WO | WO 2012/135192 | 10/2012 |
| WO | WO 2013/067404 | 5/2013 |
| WO | WO 2015/102776 | 7/2015 |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.
Lietz et al., "Method and System for Creating Enriched Log Data," U.S. Appl. No. 14/139,449, filed Dec. 23, 2013.
Cabrera et al., "Method and System for Intrusion and Extrusion Detection," U.S. Appl. No. 14/143,999, filed Dec. 30, 2013.
Cabrera et al., "Method and System for Extrusion and Intrusion Detection in a Cloud Computing Environment Using Network Communications Devices," U.S. Appl. No. 14/166,116, filed Jan. 28, 2014.
Cabrera et al., "Method and System for Extrusion and Intrusion Detection in a Cloud Computing Environment," U.S. Appl. No. 14/171,388, filed Feb. 3, 2014.
Lietz et al., "Method and System for Virtual Asset Assisted Extrusion and Intrusion Detection in a Cloud Computing Environment," U.S. Appl. No. 14/171,438, filed Feb. 3, 2014.
Bishop et al., "Method and System for Testing Cloud Based Applications in a Production Environment Using Fabricated User Data," U.S. Appl. No. 14/222,279, filed Mar. 21, 2014.
Weaver et al., "Method and System for Comparing Different Versions of a Cloud Based Application in a Production Environment Using Segregated Backend Systems," U.S. Appl. No. 14/231,141, filed Mar. 31, 2014.
Brinkley et al., "Method and System for Testing Cloud Based Applications and Services in a Production Environment Using Segregated Backend Systems," U.S. Appl. No. 14/231,253, filed Mar. 31, 2014.
Lietz et al., "Method and System for Providing Security Aware Applications," U.S. Appl. No. 14/247,131, filed Apr. 7, 2014.
Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.
Lietz et al., "Method and System for Detecting Irregularities and Vulnerabilities in Dedicated Hosting Environments," U.S. Appl. No. 14/266,018, filed Apr. 30, 2014.
Lietz et al., "Method and System for Providing Reference Architecture Pattern-Based Permissions Management," U.S. Appl. No. 14/266,107, filed Apr. 30, 2014.
Cabrera et al., "Method and Apparatus for Automating the Building of Threat Models for the Public Cloud," U.S. Appl. No. 14/288,260, filed May 27, 2014.
Bonney et al., "Method and System for Implementing Data Security Policies Using Database Classification," U.S. Appl. No. 14/289,817, filed May 29, 2014.
Lietz et al., "Method and System for Secure Delivery of Information to Computing Environments," U.S. Appl. No. 14/319,286, filed Jun. 30, 2014.
Cabrera et al., "Method and System for Efficient Management of Security Threats in a Distributed Computing Environment," U.S. Appl. No. 14/319,352, filed Jun. 30, 2014.
Lietz et al., "Method and System for Providing a Virtual Asset Perimeter," U.S. Appl. No. 14/448,281, filed Jul. 31, 2014.
Cabrera et al., "Method and System for Providing Automated Self-Healing Virtual Assets," U.S. Appl. No. 14/448,326, filed Jul. 31, 2014.

\* cited by examiner

METHOD AND SYSTEM FOR ENSURING AN APPLICATION CONFORMS WITH SECURITY AND REGULATORY CONTROLS PRIOR TO DEPLOYMENT

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets in the cloud.

In a cloud computing environment, various assets, such as, but not limited to, virtual machine instances, data stores, communications systems, and various services, are created, launched, or instantiated, in a production environment for use by an application, i.e., an "owner" of the asset, herein also referred to as a user of the asset.

Herein the terms "owner" and "user" of an asset include, but are not limited to, applications, systems, and sub-systems of software and/or hardware, as well as persons or entities associated with an account number, or other identity, through which the asset is purchased, approved managed, used, and/or created.

One major security issue in a cloud computing environment, and any production environment, is to try and ensure that each asset, and/or virtual asset, used to implement an application in a cloud computing environment, and/or production environment, is created such that the individual asset, and/or virtual asset, is in compliance with defined asset security policies.

In addition, an equally important concern is to try and ensure that each asset, and/or virtual asset, used to implement an application in a cloud computing environment, and/or production environment, is deployed in the cloud computing environment, and/or production environment, in compliance with defined application deployment security policies associated with the deployment of assets used to implement the application.

That is to say, not only is it important that individual sub-components, such as individual assets, and/or virtual assets, of an application's implementation be in compliance with applicable security and regulatory policies, but the manner and order in which the sub-components, such as individual assets, and/or virtual assets, are deployed and connected to implement the application is equally important.

Currently ensuring that both individual assets, and/or virtual assets, used to implement an application are created and operated in compliance with defined asset security policies and that each asset, and/or virtual asset, used to implement an application in a cloud computing environment, and/or production environment, is deployed in the cloud computing environment, and/or production environment, in compliance with defined application deployment security policies associated with the deployment of assets used to implement the application, is largely done in an ad-hoc manner, if at all, that is not well suited to deployment of applications in a cloud computing environment, and/or a production environment including a cloud computing environment component.

Given that applications, assets, and/or virtual assets, often process and control sensitive data, the situation described above represents a significant issue that must be resolved before highly sensitive data, such as financial data, can be safely processed in a cloud computing environment.

What is needed is a method and system for ensuring that both individual assets, and/or virtual assets, used to implement an application are created and operated in compliance with defined asset security policies and that each asset, and/or virtual asset, used to implement an application in a cloud computing environment, and/or production environment, is deployed in the cloud computing environment, and/or production environment, in compliance with defined application deployment security policies associated with the deployment of assets used to implement the application. In short, a method and system is needed to automatically and consistently ensure an application conforms with both asset level and application level security and regulatory controls prior to deployment.

SUMMARY

In one embodiment, a method and system for ensuring an application conforms with security and regulatory controls prior to deployment includes defining one or more virtual asset security policies to be applied to the creation and instantiation of virtual assets to be used to implement at least part of an application or service in a cloud computing environment and then generating virtual asset security compliance data representing instructions for ensuring compliance with the one or more virtual asset security policies.

In one embodiment, one or more application deployment security policies associated with the deployment and operational coupling and interconnectivity of virtual assets used to implement an application in a cloud computing environment are defined and then application deployment security compliance data representing instructions for ensuring compliance with the one or more application deployment security policies is generated.

In one embodiment, the virtual asset security compliance data is used to ensure each virtual asset used to implement the application is generated and/or instantiated in compliance with the one or more virtual asset security policies. The application deployment security compliance data is then used to ensure that each virtual asset used to implement the application is deployed in compliance with the one or more application deployment security policies.

In accordance with one embodiment, a method and system for ensuring an application conforms with security and regulatory controls prior to deployment includes defining one or more asset security policies to be applied to the selection, creation, and/or operation of assets to be used to deploy at least part of an application or service in a production environment and then generating asset security compliance data representing instructions for ensuring compliance with the one or more asset security policies.

In one embodiment, one or more application deployment security policies associated with the deployment of assets used to implement at least part of the application in the production environment are defined and application deployment security compliance data representing instructions for ensuring compliance with the one or more application deployment security policies is generated.

In one embodiment, the asset security compliance data is used to ensure each asset to be used to implement the application is generated and operated in compliance with the one or more asset security policies. The application deployment security compliance data is then used to ensure that each asset used to implement the application in the production environment is deployed in compliance with the one or more application deployment security policies.

Figure 1:
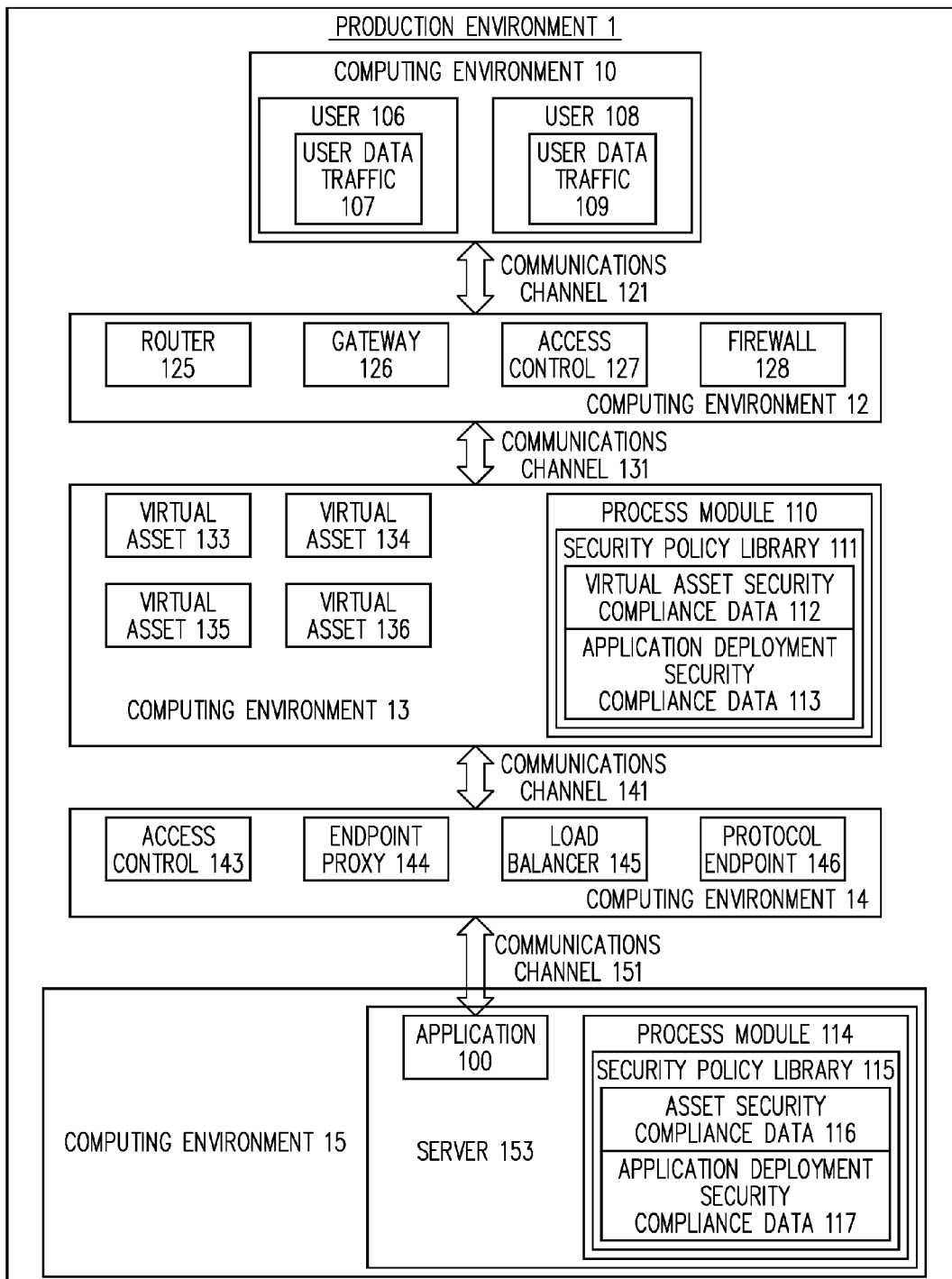
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for ensuring an application conforms with security and regulatory controls prior to deployment includes a process for ensuring an application conforms with security and regulatory controls prior to deployment implemented, at least in part, by one or more computing systems and/or computing entities in a production environment.

Herein, the term "production environment" includes the various components, or assets, used to deploy, implement, access, and use, a given application as that application is intended to be used. In various embodiments, production environments include multiple assets that are combined; communicatively coupled; virtually and/or physically connected; and/or associated with one another, to provide the production environment implementing the application.

As specific illustrative examples, the assets making up a given production environment can include, but are not limited to, one or more computing environments used to implement the application in the production environment such as a data center, a cloud computing environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, used to implement the application in the production environment; one or more communications channels used to implement the application in the production environment; one or more access control systems, such as firewalls and gateways, used to implement the application in the production environment; one or more routing systems, such as routers and switches, used to implement the application in the production environment; one or more communications endpoint proxy systems, such as load balancers or buffers, used to implement the application in the production environment; one or more traffic or access control systems used to implement the application in the production environment; one or more secure communication protocols and/or endpoints, such as Secure Sockets Layer (SSL) protocols, used to implement the application in the production environment; one or more databases used to implement the application in the production environment; one or more internal or external services used to implement the application in the production environment; one or more backend systems, such as backend servers or other hardware used to implement the application in the production environment; one or more software systems used to implement the application in the production environment; and/or any other assets/components making up an actual production environment in which an application is deployed, implemented, accessed, and run, as discussed herein, and/or as known in the art at the time of filing, and/or as developed after the time of filing.

As used herein, the terms "computing system" and "computing entity", include, but are not limited to, a virtual asset; a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In accordance with one embodiment, a method and system for ensuring an application conforms with security and regulatory controls prior to deployment includes a process for ensuring an application conforms with security and regulatory controls prior to deployment implemented, at least in part, by one or more virtual assets in a cloud computing environment. In one embodiment, the cloud computing environment is part of, or is, the production environment of the application.

In one embodiment, the production environment includes one or more cloud computing environments. In various embodiments, the cloud computing environments can be any form of cloud computing environment, such as, but not limited to, a public cloud; a private cloud; a virtual private network (VPN); a subnet; a Virtual Private Cloud, or VPC; a sub-net or any security/communications grouping; or any other cloud-based infrastructure, sub-structure, or architecture, as discussed herein, and/or as known in the art at the time of filing, and/or as developed after the time of filing.

In many cases, a given application or service provided through the production environment may utilize, and interface with, multiple cloud computing environments, such as multiple VPCs, in the course of providing the associated service. In various embodiments, each cloud computing environment includes allocated assets and virtual assets associated with, and controlled or used by, the party utilizing the cloud computing environment.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or subsystems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment, the computing systems, and/or computing entities discussed herein, and/or as known in the art at the time of filing, and/or as developed after the time of filing, can be implemented as virtual assets.

Some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets are created, or instantiated, using steps, instructions, processes, code, or "recipes" referred to herein as "virtual asset creation templates." Typically, virtual assets that have the same, or similar, operational parameters are created using the same "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any virtual appliance, or tool, or system, or framework, used to instantiate assets as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In various embodiments, the one or more assets included in the production environment and/or implementing the processes for ensuring an application conforms with security and regulatory controls prior to deployment are logically or physically located, and/or associated with, two or more computing environments. As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the assets, infrastructure, communication and networking systems, and security systems associated with the computing systems and/or virtual assets making up the trusted computing environment, are either under the control of, or known to, a party. In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party.

Examples of trusted computing environments include the assets and components making up data centers associated with, and/or controlled by, an application and/or any computing systems and/or virtual assets, and/or networks of computing systems and/or virtual assets, associated with, known by, and/or controlled by, an application. Examples of untrusted computing environments include, but are not limited to, public networks, such as the Internet, various cloud-based computing environments, and various other forms of distributed computing systems.

It is often the case that an application needs to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the application. However, in other situations a party may wish to transfer data between two trusted computing environments, and/or two untrusted computing environments.

In one embodiment, two or more assets, such as computing systems and/or virtual assets, and/or two or more computing environments, in the production environment are connected by one or more communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

FIG. 1 is a functional diagram of the interaction of various elements associated with exemplary embodiments of the methods and systems for ensuring an application conforms with security and regulatory controls prior to deployment discussed herein. Of particular note, the various elements/assets in FIG. 1 are shown for illustrative purposes as being associated with production environment 1 and specific computing environments within production environment 1, such as computing environments 10, 12, 13, 14, and 15. However, the exemplary placement of the various elements/assets within these environments and systems in FIG. 1 is made for illustrative purposes only and, in various embodiments, any individual element/asset shown in FIG. 1, or combination of elements/assets shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components, as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of an application or service, the owner or provider of one or more resources, and/or any other party and/or entity providing one or more functions, and/or any other party and/or entity as discussed herein, and/or as known in the art at the time of filing, and/or as made known after the time of filing.

In accordance with one embodiment, at least part of an application is to be implemented, or deployed, in a cloud computing environment where the application will be implemented using one or more virtual assets.

In turn, each of these virtual assets will be generated, and/or instantiated, in the cloud computing environment and then operatively connected to implement the application.

As noted above, FIG. 1 shows production environment 1. In one embodiment, production environment 1 includes computing environment 13. In one embodiment, computing environment 13 is a cloud computing environment and includes various virtual assets 133, 134, 135, and 136 used to implement application 100.

In one embodiment, one or more virtual asset security policies to be applied to the creation and instantiation of virtual assets to be used to implement the application in the cloud computing environment are defined.

As used herein the term "security policy" includes any security policy, regulatory policy, deployment policy, communication policy, encryption policy, access policy, storage policy, or any other policy or protocol used to protect data, assets, applications, services, enterprises, computing environments, and/or production environments, as discussed herein, and/or as known in the art at the time of filing, and/or as developed after the time of filing.

In various embodiments, the virtual asset security policies to be applied to the creation and instantiation of virtual assets to be used to implement the application in the cloud computing environment include any security policies desired to be implemented at the virtual asset level.

For instance, in one embodiment, the virtual asset security policies to be applied to the creation and instantiation of virtual assets to be used to implement the application in the cloud computing environment include, but are not limited to, a virtual asset security policy indicating required connectivity and communication features for the virtual assets; a virtual asset security policy indicating specific storage capability to be allocated to the virtual assets; a virtual asset security policy indicating a specific processing capability to be allocated to the virtual assets; a virtual asset security policy requiring specific hardware be allocated to the virtual assets; a virtual asset security policy requiring specific software be allocated to virtual assets; a virtual asset security policy requiring specific operational parameters be used with the virtual assets; a virtual asset security policy prohibiting a known weakness pattern in the virtual assets; a virtual asset security policy prohibiting a non-existent or incorrect buffer length; a virtual asset security policy prohibiting the inability of a virtual asset vulnerability to be successfully remediated; a virtual asset security policy requiring specific security requirements, or security level requirement, be associated with the virtual assets; a virtual asset security policy prohibiting the use or existence of a known vulnerable version of software or code in the virtual assets; a virtual asset security policy prohibiting the use or existence of code written in a language, or version of a language, known to be vulnerable to attack in the virtual assets; a virtual asset security policy requiring specific encryption, or a proper level of encryption, for data associated with the virtual assets; a virtual asset security policy requiring checks of buffer lengths; a virtual asset security policy requiring checks of the integrity of arguments; and/or any other virtual asset security policy, or combination of virtual asset security policies, as open-endedly defined by any parties and, as discussed herein, and/or as known in the art at the time of filing, and/or as become known after the time of filing.

In various embodiments, the one or more virtual asset security policies to be applied to the creation and/or instantiation of virtual assets to be used to implement the application in the cloud computing environment include any virtual asset security policy, or combination of virtual asset security policies, as discussed herein, and/or as known in the art at the time of filing, and/or as developed after the time of filing.

In one embodiment, once, the virtual asset security policies to be applied to the creation and instantiation of virtual assets to be used to implement the application in the cloud computing environment are defined, virtual asset security compliance data representing instructions for ensuring compliance with the one or more defined virtual asset security policies is generated.

In one embodiment, one or more application deployment security policies associated with the deployment and operational coupling and interconnectivity of virtual assets used to implement an application in a cloud computing environment are defined.

In various embodiments, the one or more application deployment security policies associated with the deployment and operational coupling and interconnectivity of virtual assets used to implement an application in a cloud computing environment include any security policies desired to be implemented at the application level, including various policies regarding how and when the virtual assets used to implement the application in the cloud computing environment are to be operatively coupled and/or connected and used.

For instance, in one embodiment, the one or more application deployment security policies associated with the deployment and operational coupling and interconnectivity of virtual assets used to implement an application in a cloud computing environment include, but are not limited to, the application deployment security policy that all virtual assets used to implement the application are deployed within a network container that isolates them from other applications; the application deployment security policy that all virtual assets used to implement the application are deployed within a Virtual Public Cloud (VPC); the application deployment security policy that all virtual assets must be deployed using a sanctioned secure baseline; the application deployment security policy that all virtual assets in a compute tier are network-isolated from other virtual assets of the application; the application deployment security policy that all virtual assets in a web tier or in a compute tier are accessed exclusively through the use of a virtualized load balancer; the application deployment security policy that only applications that are to have Internet access must have an IP address that is Internet accessible; the application deployment security policy that the application deploys its different virtual assets in a network manner, separating the web and/or compute tiers from data via network isolation; the application deployment security policy that all virtual asset deployments must have multi-factor authentication enabled to operate the console of the virtual assets; the application deployment security policy that all virtual asset deployments must have multi-factor authentication enabled to modify the data tier; the application deployment security policy that all virtual assets must produce log records that track all modifications to the configurations of the virtual assets; the application deployment security policy that all accesses to virtual assets must be authenticated; the application deployment security policy that all accesses to the virtual assets must be for roles authorized; the application deployment security policy that for each of the controls in a regulatory compliance regime, the virtual asset must produce log records supporting the controls; any application deployment security policy, or combination of application deployment security policies, as discussed herein, and/or as known in the art at the time of filing, and/or as developed after the time of filing.

In one embodiment, once, the one or more application deployment security policies associated with the deployment and operational coupling and interconnectivity of virtual assets used to implement an application in a cloud computing environment are defined, application deployment security compliance data representing instructions for ensuring compliance with the one or more application deployment security policies is generated.

In one embodiment, the virtual asset security compliance data and/or the application deployment security compliance data is provided to the application, and/or one or more virtual assets used to implement the application, by providing a security policy library to the application, and/or one or more virtual assets used to implement the application.

In one embodiment, the virtual asset security compliance data and/or the application deployment security compliance data is provided to the application, and/or one or more virtual assets used to implement the application, by the owner of the application, and/or one or more virtual assets used to implement the application.

In one embodiment, the virtual asset security compliance data and/or the application deployment security compliance data is provided to the application, and/or one or more virtual assets used to implement the application, by a provider of at least part of the cloud computing environment.

In one embodiment, the virtual asset security compliance data and/or the application deployment security compliance data is provided to the application, and/or one or more virtual assets used to implement the application, by a third party service provider.

In one embodiment, the virtual asset security compliance data and/or the application deployment security compliance data is provided to the application, and/or one or more virtual assets used to implement the application, through a virtual asset creation template used to instantiate at least one virtual asset used to implement the application.

As noted above, typically, virtual assets are created, or instantiated, using steps, instructions, processes, code, or "recipes" referred to herein as "virtual asset creation templates." Typically, virtual assets that have the same, or similar, operational parameters are created using the same "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

Returning to FIG. 1, in one embodiment, the virtual asset security compliance data 112 and application deployment security compliance data 113, once generated, are included in process module 110 as part of security policy library 111, of process module 110. In this specific illustrative example, process module 110 is implemented, at least in part, in computing environment 13 which includes virtual assets 133, 134, 135, and 136.

In one embodiment, the virtual asset security compliance data is then implemented to at least partially control the creation/instantiation of, or scan, each virtual asset to be used to implement the application to ensure each virtual asset used to implement the application is generated and instantiated in compliance with the one or more virtual asset security policies represented by the virtual asset security compliance data.

In one embodiment, once the virtual asset security compliance data is implemented to ensure each virtual asset used to implement the application is generated and instantiated in compliance with the one or more virtual asset security policies represented by the virtual asset security compliance data, the application deployment security compliance data is implemented, e.g., used to ensure that each virtual asset used to implement the application is deployed and operatively connected to implement the application in the cloud computing environment in compliance with the one or more application deployment security policies represented by the application deployment security compliance data.

Consequently, using the method and system for ensuring an application conforms with security and regulatory controls prior to deployment discussed above, a process is provided to ensure that both individual virtual assets used to implement an application are created and instantiated in compliance with defined virtual asset security policies and that each virtual asset used to implement an application in a cloud computing environment is deployed in the cloud computing environment in compliance with defined application deployment security policies associated with the deployment and operational coupling and interconnectivity of virtual assets used to implement the application in the cloud computing environment. In short, a method and system is provided to automatically and consistently ensure an application conforms with both virtual asset and application level security and regulatory controls prior to deployment in the cloud.

In one embodiment, the method and system for ensuring an application conforms with security and regulatory controls prior to deployment is applied to any part of a production environment, or the entire production environment, associated with the deployment of an application.

In accordance with one embodiment, a production environment is provided in which an application is to be implemented, or deployed, and where the application will be accessed and used as that application is intended to be used.

Consequently, in one embodiment the application is to be implemented in the production environment to utilize all of the production environment assets, i.e., assets used to implement the application, which are combined; communicatively coupled; virtually and/or physically connected; and/or associated with one another, to provide the production environment to be used to implement the application.

As specific illustrative examples, the application is to be implemented using, and including, assets such as, but not limited to, the one or more computing environments used to implement the application in the production environment such as a data center, a cloud computing environment, and/or one or more other computing environments in which one or more assets, components, and/or services are to be used to implement the application in the production environment are implemented; the one or more computing systems or computing entities to be used to implement the application in the production environment; the one or more virtual assets to be used to implement the application in the production environment; the one or more supervisory or control systems, such as hypervisors, to be used to implement the application in the production environment; the one or more communications channels to be used to implement the application in the production environment; the one or more access control systems, such as firewalls and gateways, to be used to implement the application in the production environment; the one or more routing systems, such as routers and switches, to be used to implement the application in the production environment; the one or more communications endpoint proxy systems, such as load balancers or buffers, to be used to implement the application in the production environment; the one or more traffic and/or access control systems to be used to implement the application in the production environment; the one or more secure communication protocols and/or endpoints, such as Secure Sockets Layer (SSL) protocols, to be used to implement the application in the production environment; the one or more databases to be used to implement the application in the production environment; the one or more internal or external services to be used to implement the application in the production environment; the one or more backend servers or other hardware to be used to implement the application in the production environment; the one or more software systems to be used to implement the application in the production environment; and/or any other components making up the actual production environment in which the application is deployed, implemented, and run, as discussed herein, and/or as known in the art at the time of filing, and/or as developed after the time of filing.

As noted above, FIG. 1 is a functional diagram of the interaction of various elements associated with one embodiment of a method and system for ensuring an application conforms with security and regulatory controls prior to deployment discussed herein. In particular, FIG. 1 shows a given application, e.g., application 100 implemented in production environment 1 on server 153 and using various assets.

As seen in FIG. 1, in this specific illustrative example, application 100 is to be implemented using, and including, assets such as, but not limited to, computing environments 10, 12, 13, 14, and 15, used to implement application 100 in production environment 1, such as a data center, a cloud computing environment, and/or one or more other computing environments in which one or more assets and/or services used to implement application 100 in production environment 1 are deployed.

As seen in FIG. 1, production environment 1 includes computing environment 10, for instance a local area network, or the Internet, that includes users 106 and 108 generating user data traffic 107 and 109, respectively, using one or more computing systems. As seen in FIG. 1, user data traffic 107 and 109 is provided to computing environment 12, such as an access layer or Internet Service Provider (ISP) service used to access application 100, via communications channel 121.

As seen in FIG. 1, production environment 1 includes computing environment 12 which, in turn, includes, as illustrative examples, one or more assets such as router 125, gateway 126, access control 127, and firewall 128. As seen in FIG. 1, in this specific illustrative example, computing environment 12 is commutatively coupled to computing environment 13 of production environment 1 by communications channel 131.

In the specific illustrative example of FIG. 1, computing environment 13 of production environment 1 is a cloud computing environment and includes various virtual assets 133, 134, 135, and 136 used to implement application 100. One example of an implementation of the methods and systems described herein in computing environment 13 of production environment 1 is discussed above where the portion of the application implemented in computing environment 13 uses process module 110.

In the specific illustrative example of FIG. 1, production environment 1 includes computing environment 14, such as an access control layer, commutatively coupled to computing environment 13 by communications channel 141. In this specific illustrative example, computing environment 14 includes assets such as exemplary access control systems, e.g., one or more of access control 143, endpoint proxy 144, load balancer 145, and protocol endpoint 146.

As seen in the specific illustrative example of FIG. 1, production environment 1 includes computing environment 15, such as a data center or infrastructure provider environment, commutatively coupled to computing environment 14 by communications channel 151. In this specific illustrative example, computing environment 15 includes assets such server 153 associated with application 100.

In one embodiment, one or more asset security policies to be applied to the selection, creation, and/or operation of assets to be used to implement the application in the production environment are defined.

As used herein the term "security policy" includes any security policy, regulatory policy, deployment policy, communication policy, encryption policy, access policy, storage policy, or any other policy or protocol used to protect data, assets, applications, services, enterprises, computing environments, and/or production environments, as discussed herein, and/or as known in the art at the time of filing, and/or as developed after the time of filing.

In various embodiments, the asset security policies to be applied to the selection, creation, and/or operation of assets to be used to implement the application in the production environment include any security policies desired to be implemented at the asset level.

For instance, in one embodiment, the asset security policies to be applied to the selection, operation, and deployment of assets to be used to implement the application in the production environment include, but are not limited to, an asset security policy indicating required connectivity and communication features for the assets; an asset security policy indicating specific storage capability to be included in, or allocated to, the assets; an asset security policy indicating a specific processing capability to be included in, or allocated to, the assets; an asset security policy requiring specific hardware be included in, or allocated to, the assets; an asset security policy requiring specific software be included in, or allocated to, assets; an asset security policy requiring specific operational parameters be used with the assets; an asset security policy prohibiting a known weakness pattern in the assets; an asset security policy prohibiting a non-existent or incorrect buffer length; an asset security policy prohibiting the inability of an asset vulnerability to be successfully remediated; an asset security policy requiring specific security requirements, or security level requirement, be associated with the assets; an asset security policy prohibiting the use or existence of a known vulnerable version of software or code with the assets; an asset security policy prohibiting the use or existence of code written in a language, or version of a language, known to be vulnerable to attack be used with the assets; an asset security policy requiring specific encryption, or a proper level of encryption, for data associated with the assets; an asset security policy requiring checks of buffer lengths; an asset security policy requiring checks of the integrity of arguments; and/or any other asset security policy, or combination of asset security policies, as open-endedly defined by any parties and, as discussed herein, and/or as known in the art at the time of filing, and/or as become known after the time of filing.

In various embodiments, the one or more asset security policies to be applied to the selection, creation, and/or operation of assets to be used to implement the application in the production environment include any asset security policy, or combination of asset security policies, as discussed herein, and/or as known in the art at the time of filing, and/or as developed after the time of filing.

In various embodiments, the one or more asset security policies to be applied to the selection, creation, and/or operation of assets to be used to implement the application in the production environment include any asset security policy, or combination of asset security policies, as discussed herein, and/or as known in the art at the time of filing, and/or as developed after the time of filing.

In one embodiment, once, the asset security policies to be applied to the selection, creation, and/or operation of assets to be used to implement the application in the production environment are defined, asset security compliance data representing instructions for ensuring compliance with the one or more defined asset security policies is generated.

In one embodiment, one or more application deployment security policies associated with the deployment of assets used to implement an application in a production environment are defined.

In various embodiments, the one or more application deployment security policies associated with the deployment of assets used to implement an application in a production environment include any application deployment security policies desired to be implemented at the application level, including various policies regarding how and when the assets used to implement the application in the production environment are to be operatively coupled and/or connected and used.

For instance, in one embodiment, the one or more application deployment security policies associated with the deployment of assets used to implement an application in a production environment include, but are not limited to, the application deployment security policy that all assets used to implement an application are deployed within a network container that isolates them from other applications; the application deployment security policy that all assets used to implement an application are deployed within a Virtual Public Cloud (VPC); the application deployment security policy that all assets must be deployed using a sanctioned secure baseline; the application deployment security policy that all assets in a compute tier are network-isolated from other assets of the application; the application deployment security policy that all assets in a web tier or in a compute tier are accessed exclusively through the use of a virtualized load balancer; the application deployment security policy that only applications that are to have Internet access must have an IP address that is Internet accessible; the application deployment security policy that the application deploys its different assets in a network manner, separating the web and/or compute tiers from data via network isolation; the application deployment security policy that all asset deployments must have multi-factor authentication enabled to operate the console of the assets; the application deployment security policy that all asset deployments must have multi-factor authentication enabled to modify the data tier; the application deployment security policy that all assets must produce log records that track all modifications to the configurations of the assets; the application deployment security policy that all accesses to assets must be authenticated; the application deployment security policy that all accesses to the assets must be for roles authorized; the application deployment security policy that for each of the controls in a regulatory compliance regime, the asset must produce log records supporting the controls; and/or any application deployment security policy, or combination of application deployment security policies, as discussed herein, and/or as known in the art at the time of filing, and/or as developed after the time of filing.

In one embodiment, once, the one or more application deployment security policies associated with the deployment of assets used to implement an application in a production environment are defined, application deployment security compliance data representing instructions for ensuring compliance with the one or more application deployment security policies is generated.

In one embodiment, the asset security compliance data and/or the application deployment security compliance data is provided to the application, and/or one or more assets used to implement the application, by providing a security policy library to the application, and/or one or more assets used to implement the application.

In one embodiment, the asset security compliance data and/or the application deployment security compliance data is provided to the application, and/or one or more assets used to implement the application, by the owner of the application, and/or one or more assets used to implement the application.

In one embodiment, the asset security compliance data and/or the application deployment security compliance data is provided to the application, and/or one or more assets used to implement the application, by a provider of at least part of the production environment.

In one embodiment, the asset security compliance data and/or the application deployment security compliance data is provided to the application, and/or one or more assets used to implement the application, by a third party service provider.

Returning to FIG. 1, in one embodiment asset security compliance data 116 and application deployment security compliance data 117, once generated, are included in process module 114 as part of security policy library 115, in this specific illustrative example in computing environment 15 which includes server 153 and application 100.

In one embodiment, the asset security compliance data is then implemented to at least partially control the creation, instantiation, or choice, of, or scan, each asset to be used to implement the application to ensure each asset used to implement the application is in compliance with the one or more asset security policies represented by the asset security compliance data.

In one embodiment, once the asset security compliance data is implemented to ensure each asset used to implement the application is generated and instantiated in compliance with the one or more asset security policies represented by the asset security compliance data, the application deployment security compliance data is implemented, e.g., used to ensure that each asset used to implement the application is deployed and operatively connected to implement the application in the production environment in compliance with the one or more application deployment security policies represented by the application deployment security compliance data.

Consequently, using the method and system for ensuring an application conforms with security and regulatory controls prior to deployment discussed above, a process is provided to ensure that both individual assets used to implement an application are created, chosen, and operated in compliance with defined asset security policies and that each asset used to implement an application in a production environment is deployed and operatively connected in the production environment in compliance with defined application deployment security policies associated with the deployment of assets used to implement the application in the production environment. In short, a method and system is provided to automatically and consistently ensure an application conforms with both asset level and application level security and regulatory controls prior to deployment in the production environment.

Process

In one embodiment, a process for ensuring an application conforms with security and regulatory controls prior to deployment includes defining one or more virtual asset security policies to be applied to the creation and instantiation of virtual assets to be used to implement at least part of an application or service in a cloud computing environment and then generating virtual asset security compliance data representing instructions for ensuring compliance with the one or more virtual asset security policies.

In one embodiment, one or more application deployment security policies associated with the deployment and operational coupling and interconnectivity of virtual assets used to implement an application in a cloud computing environment are defined and then application deployment security compliance data representing instructions for ensuring compliance with the one or more application deployment security policies is generated.

In one embodiment, the virtual asset security compliance data is used to ensure each virtual asset used to implement the application is generated and/or instantiated in compliance with the one or more virtual asset security policies. The application deployment security compliance data is then used to ensure that each virtual asset used to implement the application is deployed in compliance with the one or more application deployment security policies.

Figure 2:
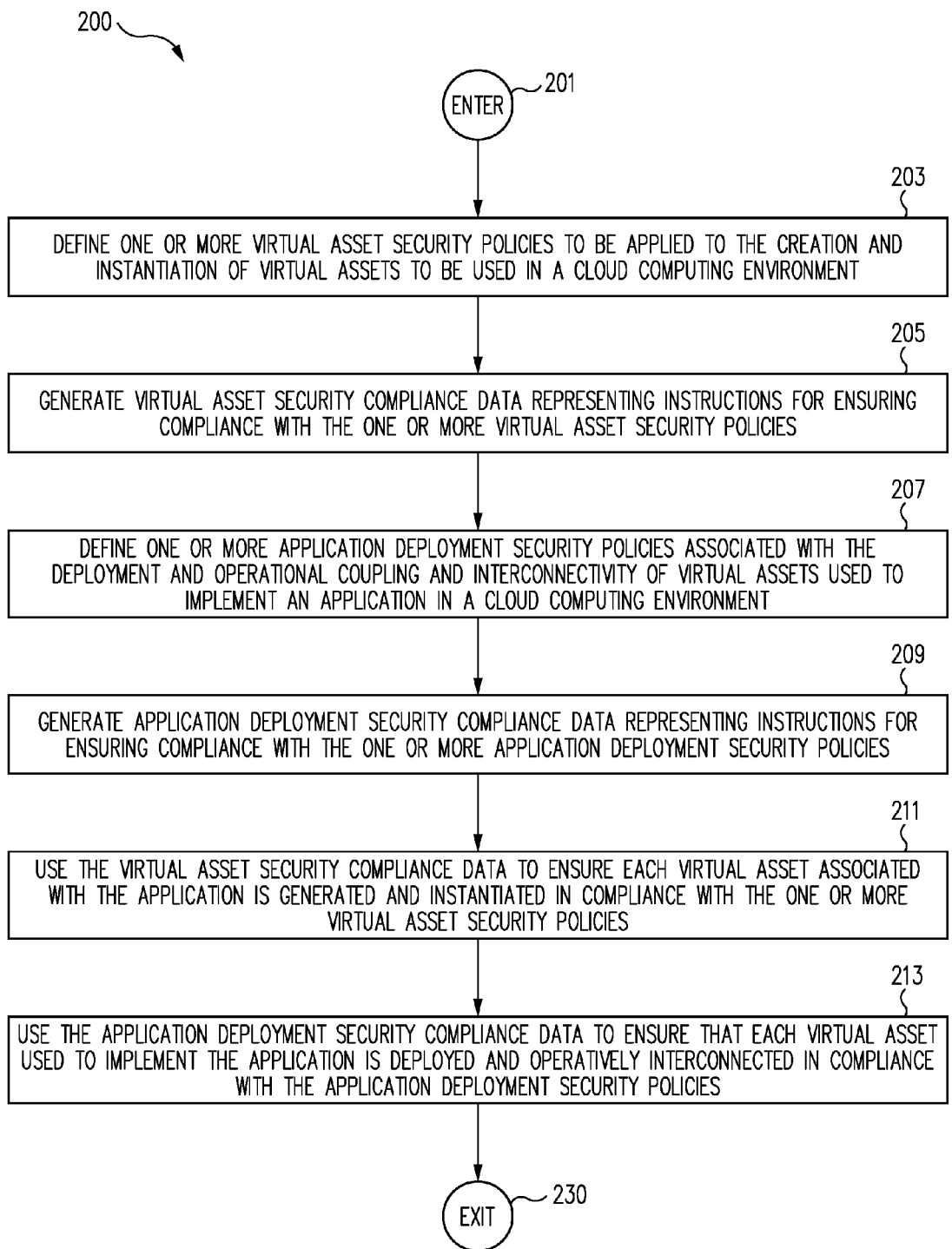
FIG. 2 is a flow chart depicting a process for ensuring an application conforms with security and regulatory controls prior to deployment in accordance with one embodiment.

FIG. 2 is a flow chart of a process 200 for ensuring an application conforms with security and regulatory controls prior to deployment in accordance with one embodiment. In one embodiment, process 200 for ensuring an application conforms with security and regulatory controls prior to deployment begins at ENTER OPERATION 201 of FIG. 2 and process flow proceeds to DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203.

In one embodiment, at DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203, one or more virtual asset security policies to be applied to the creation and instantiation of virtual assets to be used to implement an application in a cloud computing environment are defined.

As used herein the term "security policy" includes any security policy, regulatory policy, deployment policy, communication policy, encryption policy, access policy, storage policy, or any other policy or protocol used to protect data, assets, applications, services, enterprises, computing environments, and/or production environments, as discussed herein, and/or as known in the art at the time of filing, and/or as developed after the time of filing.

In various embodiments, the virtual asset security policies to be applied to the creation and instantiation of virtual assets to be used to implement the application in the cloud computing environment of DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203 include any security policies desired to be implemented at the virtual asset level.

For instance, in one embodiment, the virtual asset security policies to be applied to the creation and instantiation of virtual assets to be used to implement the application in the cloud computing environment of DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203 include, but are not limited to, a virtual asset security policy indicating required connectivity and communication features for the virtual assets; a virtual asset security policy indicating specific storage capability to be allocated to the virtual assets; a virtual asset security policy indicating a specific processing capability to be allocated to the virtual assets; a virtual asset security policy requiring specific hardware be allocated to the virtual assets; a virtual asset security policy requiring specific software be allocated to virtual assets; a virtual asset security policy requiring specific operational parameters be used with the virtual assets; a virtual asset security policy prohibiting a known weakness pattern in the virtual assets; a virtual asset security policy prohibiting a non-existent or incorrect buffer length; a virtual asset security policy prohibiting the inability of a virtual asset vulnerability to be successfully remediated; a virtual asset security policy requiring specific security requirements, or security level requirement, be associated with the virtual assets; a virtual asset security policy prohibiting the use or existence of a known vulnerable version of software or code in the virtual assets; a virtual asset security policy prohibiting the use or existence of code written in a language, or version of a language, known to be vulnerable to attack in the virtual assets; a virtual asset security policy requiring specific encryption, or a proper level of encryption, for data associated with the virtual assets; a virtual asset security policy requiring checks of buffer lengths; a virtual asset security policy requiring checks of the integrity of arguments; and/or any other virtual asset security policy, or combination of virtual asset security policies, as open-endedly defined by any parties and, as discussed herein, and/or as known in the art at the time of filing, and/or as become known after the time of filing.

In various embodiments, the one or more virtual asset security policies to be applied to the creation and/or instantiation of virtual assets to be used to implement the application in the cloud computing environment of DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203 include any virtual asset security policy, or combination of virtual asset security policies, as discussed herein, and/or as known in the art at the time of filing, and/or as developed after the time of filing.

In one embodiment, once, the virtual asset security policies to be applied to the creation and instantiation of virtual assets to be used to implement the application in the cloud computing environment are defined at DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203, process flow proceeds to GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205.

In one embodiment, once, the virtual asset security policies to be applied to the creation and instantiation of virtual assets to be used to implement the application in the cloud computing environment are defined at DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203, virtual asset security compliance data representing instructions for ensuring compliance with the one or more defined virtual asset security policies is generated at GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205.

In one embodiment, the virtual asset security compliance data represents codified machine readable instructions and data for scanning and otherwise ensuring the virtual asset security policies of DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203 are applied to the creation and instantiation of virtual assets to be used to implement the application in the cloud computing environment.

In one embodiment, once virtual asset security compliance data representing instructions for ensuring compliance with the one or more defined virtual asset security policies is generated at GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205, process flow proceeds to DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207.

In one embodiment, at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207, one or more application deployment security policies associated with the deployment and operational coupling and connectivity of the virtual assets used to implement an application in a cloud computing environment of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 are defined.

In various embodiments, the one or more application deployment security policies associated with the deployment and operational coupling and interconnectivity of virtual assets used to implement an application in a cloud computing environment of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207 include any security policies desired to be implemented at the application level, including various policies regarding how and when the virtual assets used to implement the application in the cloud computing environment are to be operatively coupled and/or connected and used.

For instance, in one embodiment, the one or more application deployment security policies associated with the deployment and operational coupling and interconnectivity of virtual assets used to implement an application in a cloud computing environment of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207 include, but are not limited to, the application deployment security policy that all virtual assets used to implement the application are deployed within a network container that isolates them from other applications; the application deployment security policy that all virtual assets used to implement the application are deployed within a Virtual Public Cloud (VPC); the application deployment security policy that all virtual assets must be deployed using a sanctioned secure baseline; the application deployment security policy that all virtual assets in a compute tier are network-isolated from other virtual assets of the application; the application deployment security policy that all virtual assets in a web tier or in a compute tier are accessed exclusively through the use of a virtualized load balancer; the application deployment security policy that only applications that are to have Internet access must have an IP address that is Internet accessible; the application deployment security policy that the application deploys its different virtual assets in a network manner, separating the web and/or compute tiers from data via network isolation; the application deployment security policy that all virtual asset deployments must have multi-factor authentication enabled to operate the console of the virtual assets; the application deployment security policy that all virtual asset deployments must have multi-factor authentication enabled to modify the data tier; the application deployment security policy that all virtual assets must produce log records that track all modifications to the configurations of the virtual assets; the application deployment security policy that all accesses to virtual assets must be authenticated; the application deployment security policy that all accesses to the virtual assets must be for roles authorized; and/or the application deployment security policy that for each of the controls in a regulatory compliance regime, the virtual asset must produce log records supporting the controls.

In various embodiments, the one or more application deployment security policies associated with the deployment and operational coupling and interconnectivity of virtual assets used to implement an application in a cloud computing environment of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207 include any application deployment security policy, or combination of application deployment security policies, as discussed herein, and/or as known in the art at the time of filing, and/or as developed after the time of filing.

In one embodiment, once, the one or more application deployment security policies associated with the deployment and operational coupling and interconnectivity of virtual assets used to implement an application in a cloud computing environment are defined at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207, process flow proceeds to GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 209.

In one embodiment, at GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 209, the one or more application deployment security policies associated with the deployment and operational coupling and interconnectivity of virtual assets used to implement an application in a cloud computing environment defined at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207 are used to generate application deployment security compliance data representing instructions for ensuring compliance with the one or more application deployment security policies.

In one embodiment, the application deployment security compliance data represents codified machine readable instructions and data for scanning and otherwise ensuring the application deployment security policies of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207 are applied to the implementation, operability, and interconnectivity of the virtual assets to be used to implement the application in the cloud computing environment.

In one embodiment, once the one or more application deployment security policies associated with the deployment and operational coupling and interconnectivity of virtual assets used to implement an application in a cloud computing environment defined at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207 are used to generate application deployment security compliance data representing instructions for ensuring compliance with the one or more application deployment security policies at GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 209, process flow proceeds to USE THE VIRTUAL ASSET SECURITY COMPLIANCE DATA TO ENSURE EACH VIRTUAL ASSET ASSOCIATED WITH THE APPLICATION IS GENERATED AND INSTANTIATED IN COMPLIANCE WITH THE ONE OR MORE VIRTUAL ASSET SECURITY POLICIES OPERATION 211.

In one embodiment, the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 and/or the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is provided to the application, and/or one or more virtual assets used to implement the application.

In one embodiment, the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 and/or the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is provided to the application, and/or one or more virtual assets used to implement the application, by providing a security policy library to the application, and/or one or more virtual assets used to implement the application.

In one embodiment, the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 and/or the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is provided to the application, and/or one or more virtual assets used to implement the application, by the owner of the application, and/or one or more virtual assets used to implement the application.

In one embodiment, the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 and/or the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is provided to the application, and/or one or more virtual assets used to implement the application, by a provider of at least part of the cloud computing environment.

In one embodiment, the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 and/or the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is provided to the application, and/or one or more virtual assets used to implement the application, by a third party service provider.

In one embodiment, the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 and/or the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is provided to the application, and/or one or more virtual assets used to implement the application, through a virtual asset creation template used to instantiate at least one virtual asset used to implement the application.

As noted above, typically, virtual assets are created, or instantiated, using steps, instructions, processes, code, or "recipes" referred to herein as "virtual asset creation templates." Typically, virtual assets that have the same, or similar, operational parameters are created using the same "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any virtual appliance, or tool, or system, or framework, used to instantiate assets as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In one embodiment, once the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 and/or the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is provided to the application, and/or one or more virtual assets used to implement the application, the virtual asset security compliance data is implemented to ensure each virtual asset used to implement the application is in compliance with the one or more virtual asset security policies at USE THE VIRTUAL ASSET SECURITY COMPLIANCE DATA TO ENSURE EACH VIRTUAL ASSET ASSOCIATED WITH THE APPLICATION IS GENERATED AND INSTANTIATED IN COMPLIANCE WITH THE ONE OR MORE VIRTUAL ASSET SECURITY POLICIES OPERATION 211.

In one embodiment, at USE THE VIRTUAL ASSET SECURITY COMPLIANCE DATA TO ENSURE EACH VIRTUAL ASSET ASSOCIATED WITH THE APPLICATION IS GENERATED AND INSTANTIATED IN COMPLIANCE WITH THE ONE OR MORE VIRTUAL ASSET SECURITY POLICIES OPERATION 211, the virtual asset security compliance data is used to at least partially control the creation/instantiation of each virtual asset to be used to implement the application to ensure each virtual asset used to implement the application is generated and instantiated in compliance with the one or more virtual asset security policies of DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203.

In one embodiment, at USE THE VIRTUAL ASSET SECURITY COMPLIANCE DATA TO ENSURE EACH VIRTUAL ASSET ASSOCIATED WITH THE APPLICATION IS GENERATED AND INSTANTIATED IN COMPLIANCE WITH THE ONE OR MORE VIRTUAL ASSET SECURITY POLICIES OPERATION 211, the virtual asset security compliance data is used to scan each virtual asset to be used to implement the application to ensure each virtual asset to be used to implement the application is in compliance with the one or more virtual asset security policies of DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203.

In one embodiment, once the virtual asset security compliance data of GENERATE VIRTUAL ASSET SECURITY COMPLIANCE DATA REPRESENTING INSTRUCTIONS FOR ENSURING COMPLIANCE WITH THE ONE OR MORE VIRTUAL ASSET SECURITY POLICIES OPERATION 205 is implemented to ensure each virtual asset used to implement the application is in compliance with the one or more virtual asset security policies of DEFINE ONE OR MORE VIRTUAL ASSET SECURITY POLICIES TO BE APPLIED TO THE CREATION AND INSTANTIATION OF VIRTUAL ASSETS TO BE USED IN A CLOUD COMPUTING ENVIRONMENT OPERATION 203 at USE THE VIRTUAL ASSET SECURITY COMPLIANCE DATA TO ENSURE EACH VIRTUAL ASSET ASSOCIATED WITH THE APPLICATION IS GENERATED AND INSTANTIATED IN COMPLIANCE WITH THE ONE OR MORE VIRTUAL ASSET SECURITY POLICIES OPERATION 211, process flow proceeds to USE THE APPLICATION DEPLOYMENT SECURITY COMPLIANCE DATA TO ENSURE THAT EACH VIRTUAL ASSET USED TO IMPLEMENT THE APPLICATION IS DEPLOYED AND OPERATIVELY INTERCONNECTED IN COMPLIANCE WITH THE APPLICATION DEPLOYMENT SECURITY POLICIES OPERATION 213.

In one embodiment, once the virtual asset security compliance data is implemented to ensure each virtual asset used to implement the application is generated and instantiated in compliance with the one or more virtual asset security policies at USE THE VIRTUAL ASSET SECURITY COMPLIANCE DATA TO ENSURE EACH VIRTUAL ASSET ASSOCIATED WITH THE APPLICATION IS GENERATED AND INSTANTIATED IN COMPLIANCE WITH THE ONE OR MORE VIRTUAL ASSET SECURITY POLICIES OPERATION 211, the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is implemented, e.g., used to ensure that each virtual asset used to implement the application is deployed and operatively connected to implement the application in the cloud computing environment in compliance with the one or more application deployment security policies of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207.

In one embodiment, once the virtual asset security compliance data is implemented to ensure each virtual asset used to implement the application is generated and instantiated in compliance with the one or more virtual asset security policies at USE THE VIRTUAL ASSET SECURITY COMPLIANCE DATA TO ENSURE EACH VIRTUAL ASSET ASSOCIATED WITH THE APPLICATION IS GENERATED AND INSTANTIATED IN COMPLIANCE WITH THE ONE OR MORE VIRTUAL ASSET SECURITY POLICIES OPERATION 211 and the application deployment security compliance data of GENERATE APPLICATION DEPLOYMENT SECURITY DATA REPRESENTING INSTRUCTIONS FOR ENSURING COMPLIANCE WITH THE ONE OR MORE APPLICATION DEPLOYMENT SECURITY POLICIES OPERATION 209 is used to ensure that each virtual asset used to implement the application is deployed and operatively connected to implement the application in the cloud computing environment in compliance with the one or more application deployment security policies of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF VIRTUAL ASSETS USED TO IMPLEMENT AN APPLICATION IN A CLOUD COMPUTING ENVIRONMENT OPERATION 207, process flow proceeds to EXIT OPERATION 230.

In one embodiment, at EXIT OPERATION 230 process 200 for ensuring an application conforms with security and regulatory controls prior to deployment is exited to await new data.

Using process 200 for ensuring an application conforms with security and regulatory controls prior to deployment discussed above, a process is provided to ensure that both individual virtual assets used to implement an application are created and instantiated in compliance with defined virtual asset security policies and that each virtual asset used to implement an application in a cloud computing environment is deployed in the cloud computing environment in compliance with defined application deployment security policies associated with the deployment and operational coupling and interconnectivity of virtual assets used to implement the application in the cloud computing environment. In short, a method and system is provided to automatically and consistently ensure an application conforms with both virtual asset and application level security and regulatory controls prior to deployment in the cloud.

In one embodiment, the method and system for ensuring an application conforms with security and regulatory controls prior to deployment is applied to any part of a production environment, or the entire production environment, associated with the deployment of an application.

In accordance with one embodiment, a process for ensuring an application conforms with security and regulatory controls prior to deployment includes defining one or more asset security policies to be applied to the selection, creation, and/or operation of assets to be used to deploy at least part of an application or service in a production environment and then generating asset security compliance data representing instructions for ensuring compliance with the one or more asset security policies.

In one embodiment, one or more application deployment security policies associated with the deployment of assets used to implement at least part of the application in the production environment are defined and application deployment security compliance data representing instructions for ensuring compliance with the one or more application deployment security policies is generated.

In one embodiment, the asset security compliance data is used to ensure each asset to be used to implement the application is generated and operated in compliance with the one or more asset security policies. The application deployment security compliance data is then used to ensure that each asset used to implement the application in the production environment is deployed in compliance with the one or more application deployment security policies.

Figure 3:
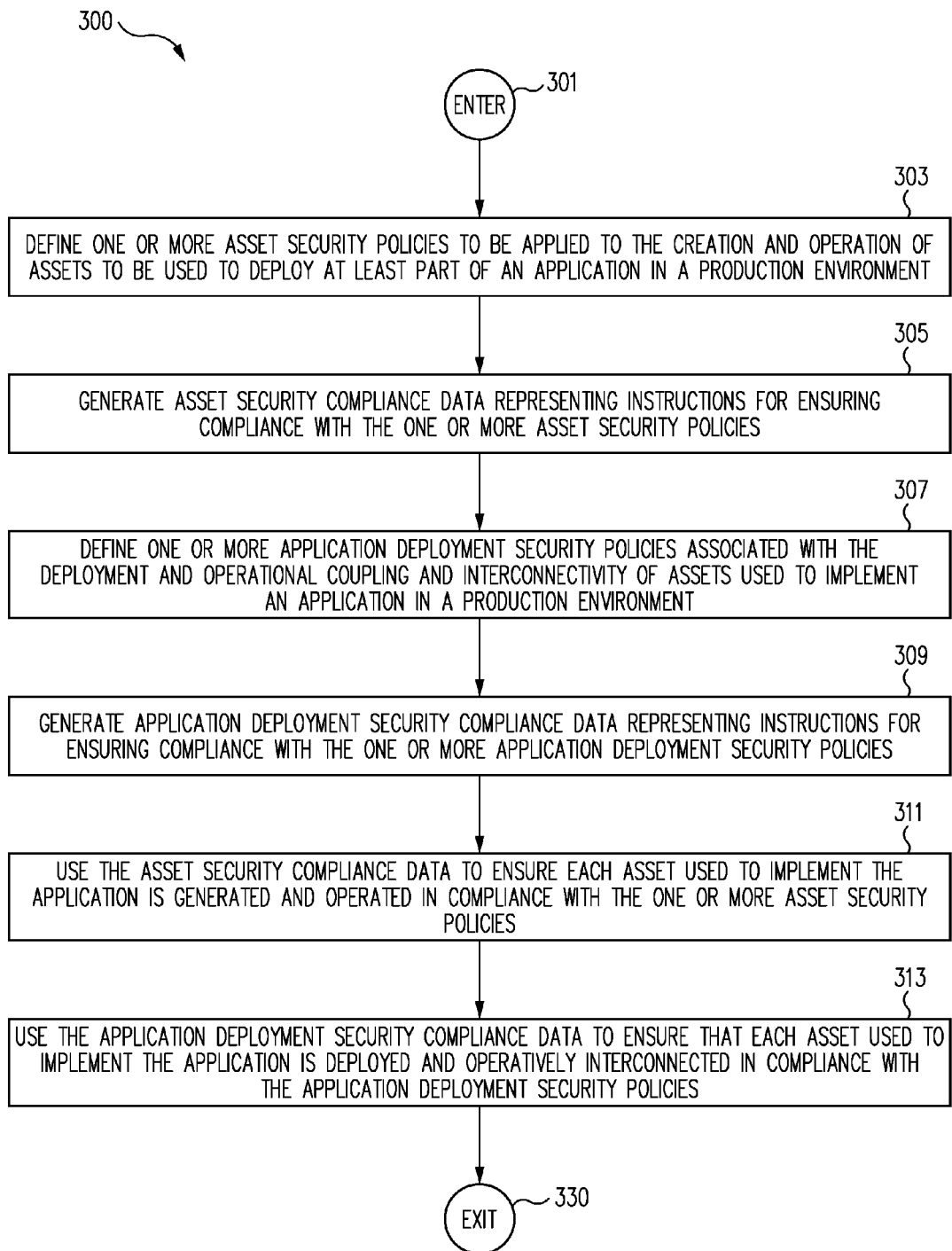
FIG. 3 is a flow chart depicting a process for ensuring an application conforms with security and regulatory controls prior to deployment in accordance with one embodiment.

FIG. 3 is a flow chart of a process 300 for ensuring an application conforms with security and regulatory controls prior to deployment in accordance with one embodiment. In one embodiment, process 300 for ensuring an application conforms with security and regulatory controls prior to deployment begins at ENTER OPERATION 301 of FIG. 3 and process flow proceeds to DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303.

In one embodiment, at DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303, one or more asset security policies to be applied to the selection, creation, and/or operation of assets to be used to implement an application in a production environment are defined.

As used herein the term "security policy" includes any security policy, regulatory policy, deployment policy, communication policy, encryption policy, access policy, storage policy, or any other policy or protocol used to protect data, assets, applications, services, enterprises, computing environments, and/or production environments, as discussed herein, and/or as known in the art at the time of filing, and/or as developed after the time of filing.

In various embodiments, the asset security policies to be applied to the selection, creation, and/or operation of assets to be used to implement the application in the production environment of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303 include any security policies desired to be implemented at the asset level.

For instance, in one embodiment, the asset security policies to be applied to the selection, creation, and/or operation of assets to be used to implement the application in the production environment of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303 include, but are not limited to, an asset security policy indicating required connectivity and communication features for the assets; an asset security policy indicating specific storage capability to be included in, or allocated to, the assets; an asset security policy indicating a specific processing capability to be included in, or allocated to, the assets; an asset security policy requiring specific hardware be included in, or allocated to, the assets; an asset security policy requiring specific software be included in, or allocated to, assets; an asset security policy requiring specific operational parameters be used with the assets; an asset security policy prohibiting a known weakness pattern in the assets; an asset security policy prohibiting a non-existent or incorrect buffer length; an asset security policy prohibiting the inability of an asset vulnerability to be successfully remediated; an asset security policy requiring specific security requirements, or security level requirement, be associated with the assets; an asset security policy prohibiting the use or existence of a known vulnerable version of software or code with the assets; an asset security policy prohibiting the use or existence of code written in a language, or version of a language, known to be vulnerable to attack be used with the assets; an asset security policy requiring specific encryption, or a proper level of encryption, for data associated with the assets; an asset security policy requiring checks of buffer lengths; an asset security policy requiring checks of the integrity of arguments; and/or any other asset security policy, or combination of asset security policies, as open-endedly defined by any parties and, as discussed herein, and/or as known in the art at the time of filing, and/or as become known after the time of filing.

In various embodiments, the one or more asset security policies to be applied to the selection, creation, and/or operation of assets to be used to implement the application in the production environment include any asset security policy, or combination of asset security policies, as discussed herein, and/or as known in the art at the time of filing, and/or as developed after the time of filing.

In various embodiments, the one or more asset security policies to be applied to the selection, creation, and/or operation of assets to be used to implement the application in the production environment of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303 include any asset security policy, or combination of asset security policies, as discussed herein, and/or as known in the art at the time of filing, and/or as developed after the time of filing.

In one embodiment, once, the asset security policies to be applied to the selection, creation, and/or operation of assets to be used to implement the application in the production environment are defined at DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303, process flow proceeds to GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305.

In one embodiment, once, the asset security policies to be applied to the selection, creation, and/or operation of assets to be used to implement the application in the production environment are defined at DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303, asset security compliance data representing instructions for ensuring compliance with the one or more defined asset security policies is generated at GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305.

In one embodiment, the asset security compliance data represents codified machine readable instructions and data for scanning and otherwise ensuring the asset security policies of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303 are applied to the selection, creation, and/or operation of assets to be used to implement the application in the production environment.

In one embodiment, once asset security compliance data representing instructions for ensuring compliance with the one or more defined asset security policies is generated at GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305, process flow proceeds to DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307.

In one embodiment, at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307, one or more application deployment security policies associated with the deployment and operational coupling and connectivity of the assets used to implement an application in a production environment of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 are defined.

In various embodiments, the one or more application deployment security policies associated with the deployment and operational coupling and interconnectivity of assets used to implement an application in a production environment of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307 include any security policies desired to be implemented at the application level, including various policies regarding how and when the assets used to implement the application in the production environment are to be operatively coupled and/or connected and used.

For instance, in one embodiment, the one or more application deployment security policies associated with the deployment and operational coupling and interconnectivity of assets used to implement an application in a production environment of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307 include, but are not limited to, the application deployment security policy that all assets used to implement an application are deployed within a network container that isolates them from other applications; the application deployment security policy that all assets used to implement an application are deployed within a Virtual Public Cloud (VPC); the application deployment security policy that all assets must be deployed using a sanctioned secure baseline; the application deployment security policy that all assets in a compute tier are network-isolated from other assets of the application; the application deployment security policy that all assets in a web tier or in a compute tier are accessed exclusively through the use of a virtualized load balancer; the application deployment security policy that only applications that are to have Internet access must have an IP address that is Internet accessible; the application deployment security policy that the application deploys its different assets in a network manner, separating the web and/or compute tiers from data via network isolation; the application deployment security policy that all asset deployments must have multi-factor authentication enabled to operate the console of the assets; the application deployment security policy that all asset deployments must have multi-factor authentication enabled to modify the data tier; the application deployment security policy that all assets must produce log records that track all modifications to the configurations of the assets; the application deployment security policy that all accesses to assets must be authenticated; the application deployment security policy that all accesses to the assets must be for roles authorized; and/or the application deployment security policy that for each of the controls in a regulatory compliance regime, the asset must produce log records supporting the controls.

In various embodiments, the one or more application deployment security policies associated with the deployment and operational coupling and interconnectivity of assets used to implement an application in a production environment of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307 include any application deployment security policy, or combination of application deployment security policies, as discussed herein, and/or as known in the art at the time of filing, and/or as developed after the time of filing.

In one embodiment, once the one or more application deployment security policies associated with the deployment and operational coupling and interconnectivity of assets used to implement an application in a production environment are defined at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307, process flow proceeds to GENERATE APPLICATION DEPLOYMENT SECURITY COMPLIANCE DATA REPRESENTING INSTRUCTIONS FOR ENSURING COMPLIANCE WITH THE ONE

OR MORE APPLICATION DEPLOYMENT SECURITY POLICIES OPERATION 309.

In one embodiment, at GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309, the one or more application deployment security policies associated with the deployment and operational coupling and interconnectivity of assets used to implement an application in a production environment defined at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307, are used to generate application deployment security compliance data representing instructions for ensuring compliance with the one or more application deployment security policies.

In one embodiment, the application deployment security compliance data represents codified machine readable instructions and data for scanning and otherwise ensuring the application deployment security policies of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307 are applied to the implementation, operability, and interconnectivity of the assets to be used to implement the application in the production environment.

In one embodiment, once the one or more application deployment security policies associated with the deployment and operational coupling and interconnectivity of assets used to implement an application in a production environment defined at DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307, are used to generate application deployment security compliance data representing instructions for ensuring compliance with the one or more application deployment security policies at GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309, process flow proceeds to USE THE ASSET SECURITY COMPLIANCE DATA TO ENSURE EACH ASSET USED TO IMPLEMENT THE APPLICATION IS GENERATED AND OPERATED IN COMPLIANCE WITH THE ONE OR MORE ASSET SECURITY POLICIES OPERATION 311.

In one embodiment, the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 and/or the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is provided to the application, and/or one or more assets used to implement the application.

In one embodiment, the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 and/or the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is provided to the application, and/or one or more assets used to implement the application, by providing a security policy library to the application, and/or one or more assets used to implement the application.

In one embodiment, the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 and/or the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is provided to the application, and/or one or more assets used to implement the application, by the owner of the application, and/or one or more assets used to implement the application.

In one embodiment, the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 and/or the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is provided to the application, and/or one or more assets used to implement the application, by a provider of at least part of the production environment.

In one embodiment, the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 and/or the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is provided to the application, and/or one or more assets used to implement the application, by a third party service provider.

In one embodiment, the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 and/or the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is provided to the application, and/or one or more assets used to implement the application, through an asset creation template used to instantiate at least one asset used to implement the application.

In one embodiment, once the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 and/or the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is provided to the application, and/or one or more assets used to implement the application, the asset security compliance data is implemented to ensure each asset used to implement the application is in compliance with the one or more asset security policies of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303 at USE THE ASSET SECURITY COMPLIANCE DATA TO ENSURE EACH ASSET USED TO IMPLEMENT THE APPLICATION IS GENERATED AND OPERATED IN COMPLIANCE WITH THE ONE OR MORE ASSET SECURITY POLICIES OPERATION 311.

In one embodiment, at USE THE ASSET SECURITY COMPLIANCE DATA TO ENSURE EACH ASSET USED TO IMPLEMENT THE APPLICATION IS GENERATED AND OPERATED IN COMPLIANCE WITH THE ONE OR MORE ASSET SECURITY POLICIES OPERATION 311, the asset security compliance data is used to at least partially control the selection, operational parameters, and deployment, of each asset to be used to implement the application to ensure each asset used to implement the application is selected, uses operational parameters, and deployed, in compliance with the one or more asset security policies of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303.

In one embodiment, at USE THE ASSET SECURITY COMPLIANCE DATA TO ENSURE EACH ASSET USED TO IMPLEMENT THE APPLICATION IS GENERATED AND OPERATED IN COMPLIANCE WITH THE ONE OR MORE ASSET SECURITY POLICIES OPERATION 311, the asset security compliance data is used to scan each asset to be used to implement the application to ensure each asset to be used to implement the application is in compliance with the one or more asset security policies of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303.

In one embodiment, once the asset security compliance data of GENERATE ASSET SECURITY COMPLIANCE DATA REPRESENTING INSTRUCTIONS FOR ENSURING COMPLIANCE WITH THE ONE OR MORE ASSET SECURITY POLICIES OPERATION 305 is implemented to ensure each asset used to implement the application is in compliance with the one or more asset security policies of DEFINE ONE OR MORE ASSET SECURITY POLICIES TO BE APPLIED TO THE SELECTION, CREATION, AND/OR OPERATION OF ASSETS TO BE USED TO DEPLOY AT LEAST PART OF AN APPLICATION IN A PRODUCTION ENVIRONMENT OPERATION 303 at USE THE ASSET SECURITY COMPLIANCE DATA TO ENSURE EACH ASSET USED TO IMPLEMENT THE APPLICATION IS GENERATED AND OPERATED IN COMPLIANCE WITH THE ONE OR MORE ASSET SECURITY POLICIES OPERATION 311, process flow proceeds to USE THE APPLICATION DEPLOYMENT SECURITY COMPLIANCE DATA TO ENSURE THAT EACH ASSET USED TO IMPLEMENT THE APPLICATION IS DEPLOYED AND OPERATIVELY INTERCONNECTED IN COMPLIANCE WITH THE APPLICATION DEPLOYMENT SECURITY POLICIES OPERATION 313.

In one embodiment, once the asset security compliance data is implemented to ensure each asset used to implement the application is selected, uses operational parameters, and deployed, in compliance with the one or more asset security policies represented by the asset security compliance data at USE THE ASSET SECURITY COMPLIANCE DATA TO ENSURE EACH ASSET USED TO IMPLEMENT THE APPLICATION IS GENERATED AND OPERATED IN COMPLIANCE WITH THE ONE OR MORE ASSET SECURITY POLICIES OPERATION 311, the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is used to ensure that each asset used to implement the application is deployed and operatively connected to implement the application in the production environment in compliance with the one or more application deployment security policies of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307.

In one embodiment, once the asset security compliance data is implemented to ensure each asset used to implement the application is selected, uses operational parameters, and deployed, in compliance with the one or more asset security policies represented by the asset security compliance data at USE THE ASSET SECURITY COMPLIANCE DATA TO ENSURE EACH ASSET USED TO IMPLEMENT THE APPLICATION IS GENERATED AND OPERATED IN COMPLIANCE WITH THE ONE OR MORE ASSET SECURITY POLICIES OPERATION 311 and the application deployment security compliance data of GENERATE APPLICATION DEPLOYMENT SECURITY COMPLIANCE DATA REPRESENTING INSTRUCTIONS FOR ENSURING COMPLIANCE WITH THE ONE OR MORE APPLICATION DEPLOYMENT SECURITY POLICIES OPERATION 309 is used to ensure that each asset used to implement the application is deployed and operatively connected to implement the application in the production environment in compliance with the one or more application deployment security policies of DEFINE ONE OR MORE APPLICATION DEPLOYMENT SECURITY POLICIES ASSOCIATED WITH THE DEPLOYMENT AND OPERATIONAL COUPLING AND INTERCONNECTIVITY OF ASSETS USED TO IMPLEMENT AN APPLICATION IN A PRODUCTION ENVIRONMENT OPERATION 307, at USE THE APPLICATION DEPLOYMENT SECURITY COMPLIANCE DATA TO ENSURE THAT EACH ASSET USED TO IMPLEMENT THE APPLICATION IS DEPLOYED AND OPERATIVELY INTERCONNECTED IN COMPLIANCE WITH THE APPLICATION DEPLOYMENT SECURITY POLICIES OPERATION 313, process flow proceeds to EXIT OPERATION 330.

In one embodiment, at EXIT OPERATION 330 process 300 for ensuring an application conforms with security and regulatory controls prior to deployment is exited to await new data.

Using process 300 for ensuring an application conforms with security and regulatory controls prior to deployment discussed above, a process is provided for ensuring that individual assets used to implement an application are created and operated in compliance with defined asset security policies and that each asset used to implement an application in a production environment is deployed in the production environment in compliance with defined application deployment security policies associated with the deployment of assets used to implement the application. In short, a method and system is provided to automatically and consistently ensure an application conforms with both asset level and application level security and regulatory controls prior to deployment in the production environment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for ensuring an application conforms with security and regulatory controls prior to deployment comprising:
    at least one memory coupled to the at least one processor, the at least one memory having stored therein instructions which when executed by any set of the one or more processors, perform a process for ensuring an application conforms with security and regulatory controls prior to deployment, the process for ensuring an application conforms with security and regulatory controls prior to deployment including:
    defining one or more virtual asset security policies to be applied to the creation and instantiation of virtual assets to be used in a cloud computing environment;
    generating virtual asset security compliance data representing instructions for ensuring compliance with the one or more virtual asset security policies;
    applying the generated virtual asset security data to a virtual asset template configured to determine one or more operational parameters of a virtual asset during instantiation of that virtual asset;
    instantiating, using the generated virtual asset security data of the virtual asset template, at least one virtual asset complying with the virtual asset security policies;
    defining one or more application deployment security policies associated with the deployment and operational coupling and interconnectivity of virtual assets used to implement an application in the cloud computing environment, the application deployment security policies including at least an application deployment security policy requiring that all virtual assets used to implement an application are deployed within a network container that isolates them from other applications;
    generating application deployment security compliance data representing instructions for ensuring compliance with the one or more application deployment security policies, the generated application deployment security compliance data representing codified machine readable instructions and data for scanning and otherwise ensuring implementation of the application deployment security policies;
    providing the generated application deployment security compliance data to the virtual asset; and
    implementing and deploying, using at least one virtual asset including the virtual asset, an application that complies with the one or more application deployment security policies.

2. The system for ensuring an application conforms with security and regulatory controls prior to deployment of claim 1 wherein at least one virtual asset used to implement the application is selected from the group of the virtual assets consisting of:
    a virtual machine;
    a virtual server;
    a database or data store;
    an instance in a cloud environment;
    a cloud environment access system;
    part of a mobile device;
    part of a remote sensor;
    part of a server computing system; and
    part of a desktop computing system.

3. The system for ensuring an application conforms with security and regulatory controls prior to deployment of claim 1 wherein at least one of the defined virtual asset security policies is selected from the group of virtual asset security policies consisting of:
    a virtual asset security policy indicating required connectivity and communication features for the virtual assets;
    a virtual asset security policy indicating specific storage capability to be allocated to the virtual assets;
    a virtual asset security policy indicating a specific processing capability to be allocated to the virtual assets;
    a virtual asset security policy requiring specific hardware be allocated to the virtual assets;
    a virtual asset security policy requiring specific software be allocated to virtual assets;
    a virtual asset security policy requiring specific operational parameters be used with the virtual assets;
    a virtual asset security policy prohibiting a known weakness pattern in the virtual assets;
    a virtual asset security policy prohibiting a non-existent or incorrect buffer length;
    a virtual asset security policy prohibiting the inability of a virtual asset vulnerability to be successfully remediated;
    a virtual asset security policy requiring specific security requirements, or security level requirement, be associated with the virtual assets;
    a virtual asset security policy prohibiting the use or existence of a known vulnerable version of software or code in the virtual assets;
    a virtual asset security policy prohibiting the use or existence of code written in a language, or version of a language, known to be vulnerable to attack in the virtual assets;
    a virtual asset security policy requiring specific encryption, or a proper level of encryption, for data associated with the virtual assets;
    a virtual asset security policy requiring checks of buffer lengths; and
    a virtual asset security policy requiring checks of the integrity of arguments.

4. The system for ensuring an application conforms with security and regulatory controls prior to deployment of claim 1 wherein at least one of the application deployment security policies is selected from the group of application deployment security policies consisting of:
    the application deployment security policy that all virtual assets used to implement an application are deployed within a Virtual Public Cloud (VPC);
    the application deployment security policy that all virtual assets must be deployed using a sanctioned secure baseline;
    the application deployment security policy that all virtual assets in a compute tier are network-isolated from other virtual assets of the application;
    the application deployment security policy that all virtual assets in a web tier or in a compute tier are accessed exclusively through the use of a virtualized load balancer;
    the application deployment security policy that only applications that are to have Internet access must have an IP address that is Internet accessible;

the application deployment security policy that the application deploys its different virtual assets in a network manner, separating the web and/or compute tiers from data via network isolation;

the application deployment security policy that all virtual asset deployments must have multi-factor authentication enabled to operate the console of the virtual assets;

the application deployment security policy that all virtual asset deployments must have multi-factor authentication enabled to modify the data tier;

the application deployment security policy that all virtual assets must produce log records that track all modifications to the configurations of the virtual assets;

the application deployment security policy that all accesses to virtual assets must be authenticated;

the application deployment security policy that all accesses to the virtual assets must be for roles authorized; and the application deployment security policy that for each of the controls in a regulatory compliance regime, the virtual asset must produce log records supporting the controls.

5. The system for ensuring an application conforms with security and regulatory controls prior to deployment of claim 1 wherein the virtual asset security compliance data and/or the application deployment security compliance data is provided by providing a security policy library to the application, and/or one or more virtual assets used to implement the application.

6. The system for ensuring an application conforms with security and regulatory controls prior to deployment of claim 1 wherein the virtual asset security compliance data and/or the application deployment security compliance data is provided through a virtual asset creation template used to instantiate at least one virtual asset used to implement the application.

7. The system for ensuring an application conforms with security and regulatory controls prior to deployment of claim 1 wherein the virtual asset security compliance data and/or the application deployment security compliance data is provided to the application, and/or one or more virtual assets used to implement the application, by the owner of the application.

8. The system for ensuring an application conforms with security and regulatory controls prior to deployment of claim 1 wherein the virtual asset security compliance data and/or the application deployment security compliance data is provided by a provider of at least part of the cloud computing environment.

9. The system for ensuring an application conforms with security and regulatory controls prior to deployment of claim 1 wherein the virtual asset security compliance data and/or the application deployment security compliance data is provided by a third party service provider.

10. A system for ensuring an application conforms with security and regulatory controls prior to deployment comprising:

an application;

a cloud computing environment in which at least part of the application is deployed;

a data store including virtual asset security compliance data representing instructions for implementing one or more virtual asset security policies and/or ensuring compliance with the one or more virtual asset security policies;

a data store including application deployment security compliance data representing codified machine readable instructions for scanning and otherwise ensuring implementation one or more application deployment security policies and/or ensuring compliance with the one or more application deployment security policies, the application deployment security policies including at least an application deployment security policy requiring that all virtual assets used to implement an application are deployed within a network container that isolates them from other applications;

at least one memory coupled to the at least one processor, the at least one memory having stored therein instructions which when executed by any set of the one or more processors, perform a process for ensuring an application conforms with security and regulatory controls prior to deployment, the process for ensuring an application conforms with security and regulatory controls prior to deployment including:

applying the generated virtual asset security data to a virtual asset template configured to determine one or more operational parameters of a virtual asset during instantiation of that virtual asset;

instantiating, using the generated virtual asset security data of the virtual asset template, at least one virtual asset complying with the virtual asset security policies;

providing the generated application deployment security compliance data to the virtual asset; and implementing and deploying, using at least one virtual asset including the instantiated virtual asset, an application that complies with the one or more application deployment security policies.

11. The system for ensuring an application conforms with security and regulatory controls prior to deployment of claim 10 wherein at least one virtual asset used to implement the application is selected from the group of the virtual assets consisting of:

a virtual machine;
a virtual server;
a database or data store;
an instance in a cloud environment;
a cloud environment access system;
part of a mobile device;
part of a remote sensor;
part of a server computing system; and
part of a desktop computing system.

12. The system for ensuring an application conforms with security and regulatory controls prior to deployment of claim 10 wherein at least one of the defined virtual asset security policies is selected from the group of virtual asset security policies consisting of:

a virtual asset security policy indicating required connectivity and communication features for the virtual assets;

a virtual asset security policy indicating specific storage capability to be allocated to the virtual assets;

a virtual asset security policy indicating a specific processing capability to be allocated to the virtual assets;

a virtual asset security policy requiring specific hardware be allocated to the virtual assets;

a virtual asset security policy requiring specific software be allocated to virtual assets;

a virtual asset security policy requiring specific operational parameters be used with the virtual assets;

a virtual asset security policy prohibiting a known weakness pattern in the virtual assets;

a virtual asset security policy prohibiting a non-existent or incorrect buffer length;

a virtual asset security policy prohibiting the inability of a virtual asset vulnerability to be successfully remediated;

a virtual asset security policy requiring specific security requirements, or security level requirement, be associated with the virtual assets;

a virtual asset security policy prohibiting the use or existence of a known vulnerable version of software or code in the virtual assets;

a virtual asset security policy prohibiting the use or existence of code written in a language, or version of a language, known to be vulnerable to attack in the virtual assets;

a virtual asset security policy requiring specific encryption, or a proper level of encryption, for data associated with the virtual assets;

a virtual asset security policy requiring checks of buffer lengths; and a virtual asset security policy requiring checks of the integrity of arguments.

13. The system for ensuring an application conforms with security and regulatory controls prior to deployment of claim 10 wherein at least one of the application deployment security policies is selected from the group of application deployment security policies consisting of:

the application deployment security policy that all virtual assets used to implement an application are deployed within a Virtual Public Cloud (VPC);

the application deployment security policy that all virtual assets must be deployed using a sanctioned secure baseline;

the application deployment security policy that all virtual assets in a compute tier are network-isolated from other virtual assets of the application;

the application deployment security policy that all virtual assets in a web tier or in a compute tier are accessed exclusively through the use of a virtualized load balancer;

the application deployment security policy that only applications that are to have Internet access must have an IP address that is Internet accessible;

the application deployment security policy that the application deploys its different virtual assets in a network manner, separating the web and/or compute tiers from data via network isolation;

the application deployment security policy that all virtual asset deployments must have multi-factor authentication enabled to operate the console of the virtual assets;

the application deployment security policy that all virtual asset deployments must have multi-factor authentication enabled to modify the data tier;

the application deployment security policy that all virtual assets must produce log records that track all modifications to the configurations of the virtual assets;

the application deployment security policy that all accesses to virtual assets must be authenticated;

the application deployment security policy that all accesses to the virtual assets must be for roles authorized; and the application deployment security policy that for each of the controls in a regulatory compliance regime, the virtual asset must produce log records supporting the controls.

14. The system for ensuring an application conforms with security and regulatory controls prior to deployment of claim 10 wherein the virtual asset security compliance data and/or the application deployment security compliance data is provided by providing a security policy library to the application, and/or one or more virtual assets used to implement the application.

15. The system for ensuring an application conforms with security and regulatory controls prior to deployment of claim 10 wherein the virtual asset security compliance data and/or the application deployment security compliance data is provided through a virtual asset creation template used to instantiate at least one virtual asset used to implement the application.

16. The system for ensuring an application conforms with security and regulatory controls prior to deployment of claim 10 wherein the virtual asset security compliance data and/or the application deployment security compliance data is provided to the application, and/or one or more virtual assets used to implement the application, by the owner of the application.

17. The system for ensuring an application conforms with security and regulatory controls prior to deployment of claim 10 wherein the virtual asset security compliance data and/or the application deployment security compliance data is provided by a provider of at least part of the cloud computing environment.

18. The system for ensuring an application conforms with security and regulatory controls prior to deployment of claim 10 wherein the virtual asset security compliance data and/or the application deployment security compliance data is provided by a third party service provider.

* * * * *